United States Patent [19]

Röhrs

[11] Patent Number: 5,738,223
[45] Date of Patent: Apr. 14, 1998

[54] SCREEN CONVEYOR BELT

[75] Inventor: Friederich Röhrs, Celle, Germany

[73] Assignee: Gummi-Jäger KG GmbH & Cie., Hanover, Germany

[21] Appl. No.: 376,105

[22] Filed: Jan. 20, 1995

[30] Foreign Application Priority Data

Jan. 20, 1994 [DE] Germany .................. 44 01 586.0

[51] Int. Cl.⁶ ............................................ B07B 1/10
[52] U.S. Cl. .......................... 209/307; 209/665; 198/848
[58] Field of Search ........................ 198/848, 850; 209/307, 308, 665; 171/130, 132, 126

[56] References Cited

U.S. PATENT DOCUMENTS

| | | | |
|---|---|---|---|
| 1,723,357 | 8/1929 | Koopman | 198/850 X |
| 2,906,395 | 9/1959 | Greer | 198/850 |
| 4,023,671 | 5/1977 | Kramer | 198/850 X |
| 4,553,663 | 11/1985 | Johnson | 198/848 X |
| 4,724,909 | 2/1988 | Link | 198/850 X |
| 5,176,248 | 1/1993 | Allen et al. | 209/307 X |

*Primary Examiner*—D. Glenn Dayoan
*Attorney, Agent, or Firm*—Robert W. Becker & Associates

[57] ABSTRACT

A screen conveyor belt for farming equipment has a plurality of flat belt members having a longitudinal extension in the direction of travel of the screen conveyor belt and being arranged parallel to one another. Rod members extend perpendicular to the direction of travel and are spaced from one another in the direction of travel so as to form therebetween openings of the screen conveyor belt. The rod members have a first and a second flat end section and a central operative portion located between the first and second flat end sections. The first and second flat end sections of each one of the rod members are positioned on adjacent ones of the belt members, respectively. Fasteners for connecting the flat end sections to the flat belt members are provided and the fasteners penetrate the flat end sections. A thickness of the flat end sections is greater adjacent to the central operative portion than at the free end of the flat end sections.

14 Claims, 2 Drawing Sheets

SCREEN CONVEYOR BELT

BACKGROUND OF THE INVENTION

The present invention relates to a screen conveyor belt for farming equipment, especially harvesting equipment whereby the rod members that delimit the openings of the screen structure extend transverse to the direction of travel of the screen conveyor belt and rest with their flat end sections on the circulating belt members where they are fastened by screws, rivets etc. that penetrate the end sections.

In the known screen conveyor belts of this kind the fastening of the aforementioned flat end sections cannot be achieved with a single rivet etc. It is instead necessary to provide at least two rivets etc. in the direction of longitudinal extension of the rod member whereby for the rivet that is remote from the free end of the rod members problems may result due to the weakening of the end section by the bore hole in which the rivet is received.

It is therefore an object of the present invention to improve on the aforementioned screen conveyor belt by providing a special design of the rod members and a more favorable load distribution of the aforementioned end section with respect to stability.

SUMMARY OF THE INVENTION

A screen conveyor belt for farm equipment according to the present invention is primarily characterized by:

A plurality of flat belt members having a longitudinal extension in the direction of travel of the screen conveyor belt and being arranged parallel to one another;

Rod members extending perpendicular to the direction of travel and being spaced from one another in the direction of travel so as to form therebetween openings of the screen conveyor belt;

The rod members comprising a first and a second flat end sections and a central operative portion located between the first and second flat end section;

The first and second flat end sections of each one of the rod members positioned respectively on two adjacent ones of the flat belt members;

Fasteners for connecting the flat end sections to the flat belt members wherein the fasteners penetrate the flat end sections; and Wherein a thickness of the flat end sections is greater adjacent to the central operative portion then at a free end of the flat end sections.

Preferably, the flat end sections are stepped.

Advantageously, the thickness of the flat end sections decreases continuously from the central portion to the free ends.

In a preferred embodiment of the present invention, a first one of the belt members, viewed in the direction of travel, has a second one of the belt members positioned on the left side thereof and a third one of the belt members positioned on the right side thereof. A first set of the rod members extends from the first belt member to the second belt member and a second set of the rod members extends from the first belt member to the third belt member. The first flat end sections of the first set and the first flat end sections of the second set are placed in an overlapping arrangement on top of one another onto the central belt.

Preferably, a thickness of the overlapping arrangement of the first flat end portions of the first and second sets corresponds substantially to a thickness of the central operative portion of the rod members.

Advantageously, the first flat end sections of the first and second sets have at least one step with at least one step surface.

Advantageously, the step surfaces of the first flat end sections of the first and second sets rest at one another in the overlapping arrangement.

Expediently, for each step two of the fasteners are provided, with the first one of the two fasteners positioned before the step and a second one of the two fasteners positioned behind the step when viewed in a longitudinal extension of the rod members.

Expediently, the overlapping arrangement has one step and two of the fasteners.

In the preferred embodiment of the present invention, the first flat end sections of the overlapping arrangement have a form-fitting connection effective against transverse forces.

Advantageously, the first end section of the first set is concave and the first end section of the second set is convex.

Advantageously, the second flat end sections have a first surface resting on the belt member and a second surface opposite the first surface, wherein the first surface is flush with a downward side (facing the belt members) of the operative portion of the rod member, and wherein the second surface extends such that the thickness of the flat end sections is greater adjacent to the central operative portion than at the free end of the flat end sections.

Preferably, the thickness of the end section at the central operative portion is 1.3 to 2 times the thickness of the end section at the free end.

Advantageously, in the area of the thickness at the central operative portion the flat end section is slightly wider than in the area of the thickness at the free end.

According to the present invention, the flat end sections of the rod members have a greater thickness in the vicinity of the operative central portion of the rod member as compared to a thickness at the free ends of the flat end sections. Thus, for the aforementioned flat end section of the rod members different thickness is provided in order to thus provide within the aforementioned end section a greater stability. The different thickness, whereby a substantially uniform width of the flat end section is presupposed, can be achieved with stepping, but also with a continuous decrease of the thickness, optionally also by combining these two methods.

For a screen conveyor belt comprised of three parallel belt members wit one central belt member the inventive design of the flat end sections of the rod members also provides for the possibility to have an overlapping arrangement of the rod members, positioned on opposite sides of the screen conveyor belt, in the center of the screen conveyor belt. The overlapping flat end sections of the two rod members that are combined in the center are preferably selected with respect to their thickness such that over the entire overlap length the total height or thickness of the two flat end sections is not substantially greater than the height or thickness of the central operative portion of the rod members between the belt members. It is to be understood that when using two rivets for fastening the overlapping arrangement they are positioned such that each rivet penetrates two portions of different thickness of the flat end sections.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
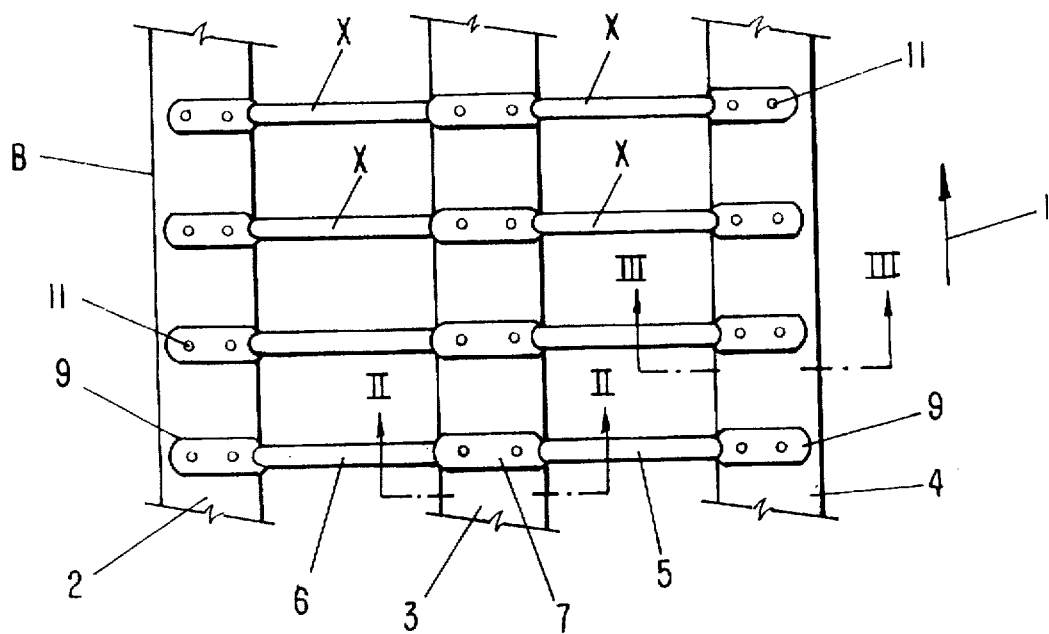
FIG. 1 shows a partial top view of a screen conveyor belt for farming equipment, especially harvesting machines.

The endless screen conveyor belt B which moves in the direction of travel 1 (see arrow 1) is endless and guided on drive and guide rollers. It comprises three endless, pull-resistant belt members 2, 3, and 4, made, for example, from fabric-reinforced rubber material. The flat belt members 2, 3, and 4 extend parallel in the longitudinal direction of the screen conveyor belt. These belt members serve to hold rod members 5, 6 which extend transverse to the belt members 2 to 4 and which are commonly comprised of steel. The rod members 5, 6 are spaced from one another and thus define, together with the belt members, the mesh size of the screen, respectively, the screening grate of the screen conveyor belt.

All rods 5, 6 are provided with flat end sections 7, 8, and 9 at both ends and have a round central operative portion X (grate-forming portion). The flat end sections 7, 8, 9 are provided with two bore holes 10 for receiving rivets 11. The rivets 11 not only penetrate the flat end section 7–9, but also the belt members 2 to 4 and the metal plate 12 below.

Figure 2:
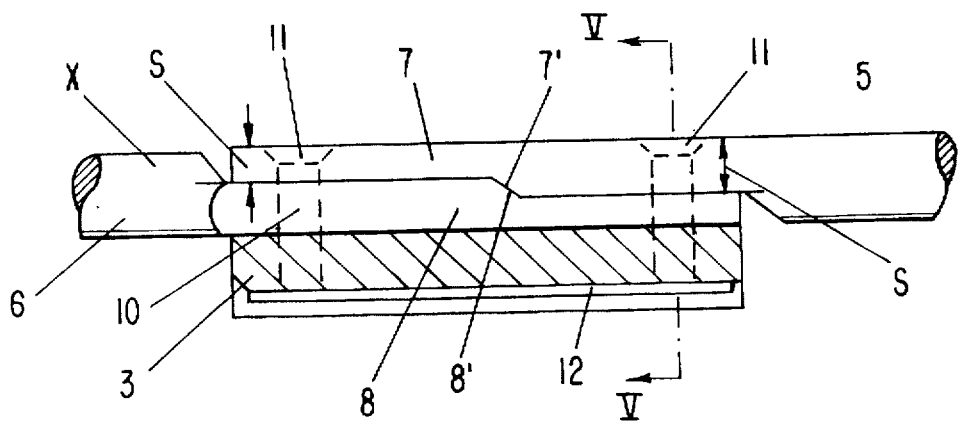
FIG. 2 shows a section along the line II—II of FIG. 1.
Figure 3:
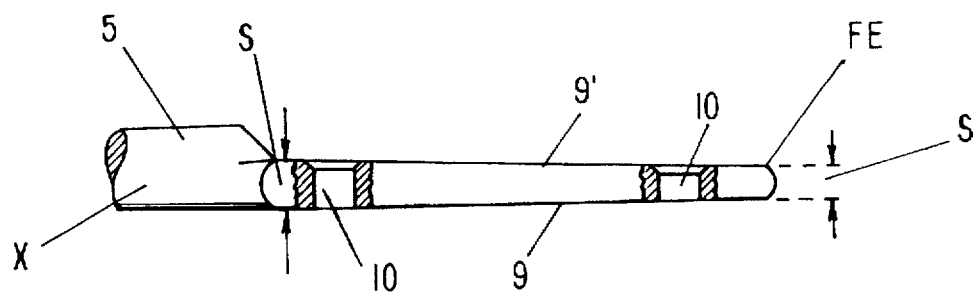
FIG. 3 shows a section along the line III—III of FIG. 1 wherein the corresponding belt member is not shown.
Figure 4:
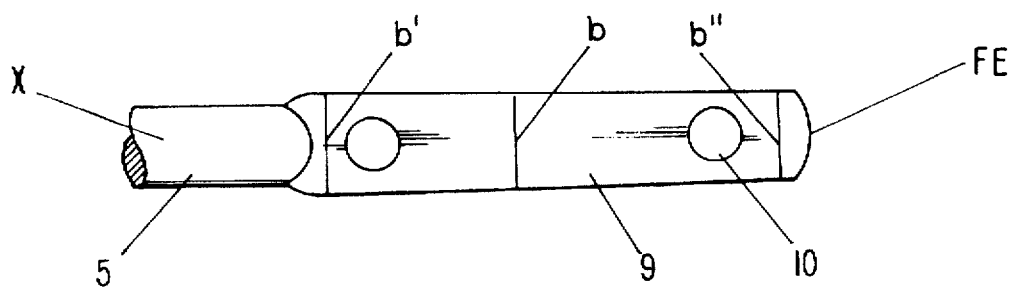
FIG. 4 shows a plan view of the representation of FIG. 3.

The flat end sections 7 to 9 are designed such that for a substantially uniform width b their thickness s at the free end FE of the rods 5, 6 is less than the thickness S at the opposite end of the flat end section in the vicinity of the central operative portion X of the rod members 5, 6 positioned between the belt members 2 and 3, respectively, 3 and 4. This means that S is greater than s. With such a design the stability of the end section is increased. This thickness, as can be seen in FIG. 2, can be achieved by stepping, or, in the alternative according to FIG. 3, by providing a continuously tapering of the end section. In any case, the reduction in thickness from S to s should be approximately about half the greatest thickness S.

The present invention is of special importance in regard to screen conveyor belts of FIG. 1 that comprise a centrally arranged belt member 3 and end sections 7, 8 from oppositely extending rod members connected thereto. For such conveyor belts, the end sections 7, 8 are arranged in an overlapping arrangement such that the individual end sections each complement the thickness of the other. The resulting total thickness of the overlapping end sections is practically identical to the diameter of the rod members 5, 6 at the central operative portion X. Thus, even though an overlapping arrangement is provided, the screen conveyor belt B does not have a thicker area at the belt member 3.

Figure 5:
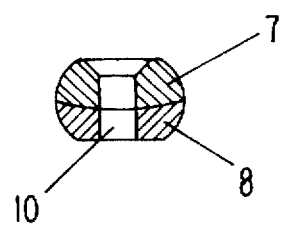
FIG. 5 shows a section along line V—V of FIG. 2 wherein the corresponding belt member is not shown.

FIG. 5 shows that the flat end sections 7, 8 engage one another in a form-fitting manner in order to avoid lateral relative movements. The facing and abutting surfaces of the flat end section 7, 8 are slightly concave, respectively, convexly curved for this purpose.

It should be noted that in the overlapping arrangement of FIG. 2 it is expedient to provide a step within the flat end sections 7, 8 such that the step surfaces 7' and 8' abut one another in order to be able to transfer lateral forces and thereby relieve the rivet 11, for example. In the area of the belt members 2, 4 it is possible to use a conical tapering according to FIG. 3. Furthermore, it is possible to vary the width b of the end sections 7, 8, 9 such that a somewhat greater width b' is provided at the end thereof adjacent to the central operative portion X as compared to the width b" at the free end of the flat end section.

A further variation of the present invention is to provide smaller thickness changes, wherein, for example, the thickness S is about 1.3 to 1.8 times the value of the thickness. In practice, 6.5 to 4.5 mm for s and 7 to 5 mm for S are feasible.

The present invention is, of course, in no way restricted to the specific disclosure of the specification and drawings, but also encompasses any modifications within the scope of the appended claims.

What I claim is:

1. A screen conveyor belt for farm equipment, said screen belt comprising:
    a plurality of flat belt members having a longitudinal extension in a direction of travel of said screen conveyor belt and arranged parallel to one another;
    rod members extending perpendicular to the direction of travel and being spaced from one another in the direction of travel so as to form therebetween openings of said screen conveyor belt;
    said rod members comprising a first and a second flat end sections and a central operative portion located between said first and second flat end sections, wherein between said central operative portion and said first and second flat end sections respectively a transition portion is located;
    said first and second flat end sections of each one of said rod members positioned respectively on two adjacent ones of said flat belt members;
    fasteners for connecting said flat end sections to said flat belt members, wherein said fasteners penetrate said flat end sections; and
    wherein a thickness of said flat end sections is greater adjacent to said transition portion than at a free end of said flat end sections.

2. A screen conveyor belt according to claim 1, wherein said flat end sections are stepped.

3. A screen conveyor belt according to claim 1, wherein the thickness of said flat end sections decreases continuously from said central portion to said free ends.

4. A screen conveyor belt according to claim 1, wherein:
    a first one of said belt members, viewed in the direction of travel, has a second one of said belt members positioned on the left side thereof and a third one of said belt members positioned on the right side thereof;
    a first set of said rod members extends from said first belt member to said second belt member and a second set of said rod members extends from said first belt member to said third belt member;
    said first flat end sections of said first set and said first flat end sections of said second set are placed in an overlapping arrangement on top of one another onto said central belt.

5. A screen conveyor belt according to claim 4, wherein a thickness of said overlapping arrangement of said first flat end sections of said first and second sets corresponds substantially to a thickness of said central operative portion of said rod members.

6. A screen conveyor belt according to claim 5, wherein said first flat end sections of said first and second sets have at least one step with at least one step surface.

7. A screen conveyor belt according to claim 6, wherein said step surfaces of said first flat end sections of said first and second sets rest at one another in said overlapping arrangement.

8. A screen conveyor belt according to claim 6, wherein for each said step two of said fasteners are provided, with a first one of said two fasteners positioned before said step and a second one of said two fasteners positioned behind said step when viewed in a longitudinal extension of said rod members.

9. A screen conveyor belt according to claim 6, wherein said overlapping arrangement has one of said steps and two of said fasteners.

10. A screen conveyor belt according to claim 4, wherein said first flat end sections of said overlapping arrangement have a form-fitting connection effective against transverse forces.

11. A screen conveyor belt according to claim 10, wherein said first end section of said first set is concave and said first end section of said second set is convex.

12. A screen conveyor belt according to claim 1, wherein said second flat end sections have a first surface resting on said belt member and a second surface opposite said first surface, wherein said first surface is flush with a downward side of said operative portion facing said belt members, and wherein said second surface extends such that the thickness of said flat end sections is greater adjacent to said transition portion than at said free end of said flat end sections.

13. A screen conveyor belt according to claim 1, wherein said thickness of said flat end section adjacent to said transition portion is 1.3 to 2 times said thickness of said flat end section at said free end.

14. A screen conveyor belt according to claim 1, wherein in the area of said thickness at said transition portion said flat end section is slightly wider than in the area of said thickness at said free end.

* * * * *